Figures 1, 2:
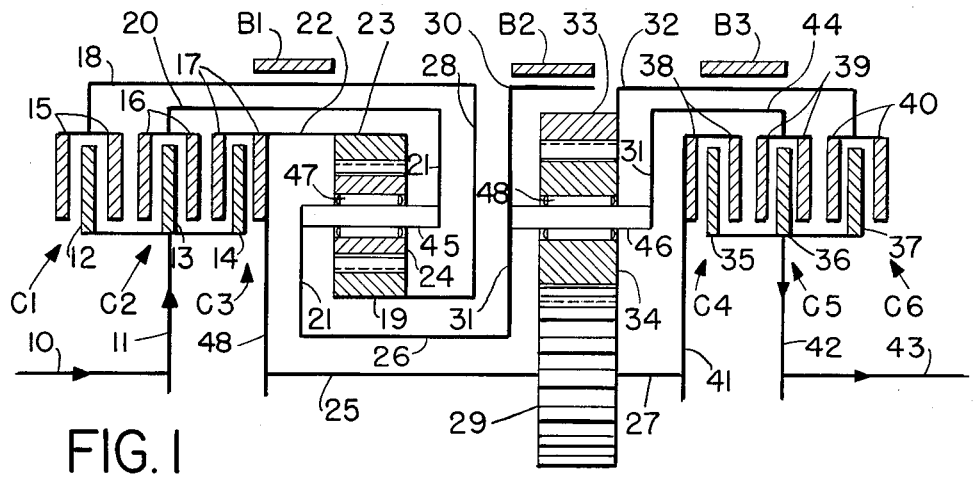

| SPEED | BRAKES & CLUTCHES ENGAGED IN EACH SPEED | | | | | | | RATIO | MPH. |
|---|---|---|---|---|---|---|---|---|---|
| 1 |  | B2 |  | C1 |  |  |  | C6 | 5.0 | 1.2 |
| 2 |  |  | B3 |  |  | C3 |  | C5 | 4.3 | 1.4 |
| 3 | B1 |  |  |  |  | C3 |  | C6 | 2.1 | 2.9 |
| 4 | B1 |  |  |  |  | C3 | C5 |  | 1.7 | 3.6 |
| 5 | B1 |  |  |  | C2 |  |  | C6 | 1.25 | 4.8 |
| 6 |  |  |  |  | C2 |  | C5 |  | 1.0 | 6.0 |
| 7 | B1 |  |  |  | C2 |  | C4 |  | .60 | 10.0 |
| 8 |  |  | B3 |  | C2 |  | C4 |  | .23 | 26.1 |
| R1 |  |  | B3 | C1 |  |  | C5 |  | 4.0 | 1.5 |
| R2 |  | B2 |  |  |  | C3 |  | C6 | 3.3 | 1.8 |
| R3 |  | B2 |  | C1 |  |  | C4 |  | 1.5 | 4.0 |
| R4 |  |  | B3 | C1 |  |  | C4 |  | .92 | 6.5 |

*INVENTOR.*
*Howard W. Simpson.*

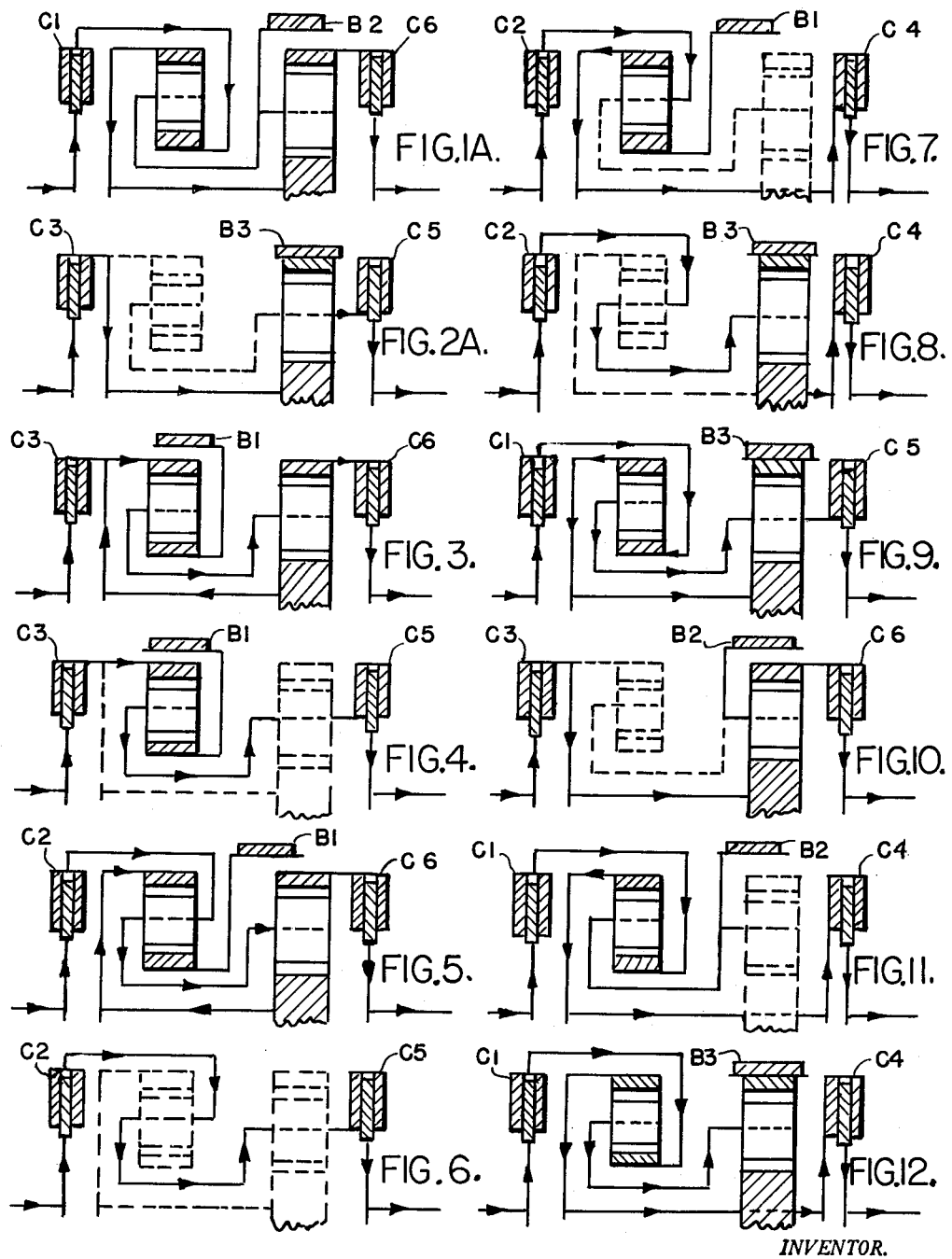

under the influence of hydraulic pressure to engage driven plates
3,031,901
TWELVE SPEED POWER SHIFT PLANETARY TRANSMISSION
Howard W. Simpson, 730 Crescent Drive, Dearborn, Mich.
Filed Sept. 23, 1959, Ser. No. 841,882
4 Claims. (Cl. 74—759)

This invention relates to planetary gearing for self propelled vehicles and especially those requiring many travel speeds both forward and backward, such as farm and industrial tractors.

It is a novel combination of two simple planetary gear sets, friction clutches and reaction brakes arranged to provide eight forward speeds and four speeds in reverse. These twelve useful gear ratios are the largest number of speeds known, by the inventor, to have been obtained from only two planetary gear sets and thus comprise a new and useful addition to transmission art. The transmission is in fact, several transmissions combined into one unit, because one or more of the clutches or brakes can be omitted if fewer forward or reverse speeds or fewer of both are desired, and the remaining gear ratios are still properly spaced for use in various types of vehicles. This is described in detail later.

Many speeds are obtained by coupling the two simple gear sets in many ways so that many different torque paths through the gearing are obtained.

For instance, three different torque paths through the first or left hand gear set alone provide fourth, seventh and third reverse speeds.

Next, three different paths through the second gear set alone provide second, eighth and second reverse speeds.

Next, four different paths through both planetary sets occur when the two sets are coupled differentially to produce third, fifth, first reverse and fourth reverse speeds.

First speed is provided by coupling the gear sets in compound relationship, and finally, sixth forward speed is provided by locking up both gear sets in direct one to one drive.

An object of the invention is to provide a large number of useful gear ratios.

Another object is to provide a gear arrangement so flexible in concept that, in addition to eight forward and four reverse speeds, other combinations can be obtained. For instance, five forward and one reverse speed, five forward and two reverse speeds or seven forward and two reverse speeds, can be obtained by omitting one or two of the friction elements of the combination.

Another object is to provide a gear combination in which many different torque paths can be obtained through the same gearing.

These and other objects will be apparent from the following description and drawings in which FIG. 1 is a partial elevation in partial section showing the two gear sets, six clutches and three reaction brakes of the combination. It is in diagrammatic form with shafts, webs and cylindrical drums shown by single lines.

Brake bands are shown in section as horizontal rectangles and are raised slightly off their brake drums as when in released position.

Clutches are also shown in the released position and each comprises three thick plates which can be forced together to couple the middle plate to the two adjacent ones.

FIG. 2 shows the various brakes and clutches which must be engaged to obtain the eight forward and four reverse speeds. This is accomplished by suitable valving which directs hydraulic pressure to the servo cylinders which operate these members.

FIG. 2 also shows gear ratios and typical corresponding miles per hour travel speeds that are typical of this combination.

FIGS. 1A, 2A, 3, 4, 5, 6, 7 and 8 show the eight forward speeds respectively with only the clutches and brakes shown which are engaged, the others being omitted for clarity. Arrows indicate torque paths through the gearing. FIGS. 9–12 show respectively the four reverse speeds in like manner.

In FIG. 1, input shaft 10 is coupled to clutch driving plates 12, 13 and 14 of clutches C1, C2 and C3 respectively by web 11. Driven plates 15, though not shown as axially slideable, are intended to be so in an actual commercial embodiment to allow them to press against both sides of driving plate 12 and thus engage clutch C1. The hydraulic means for this is not shown as it is not a part of this invention, and comprises structure known to those skilled in transmission art.

In like manner driven plates 16 are slideable to contact driving plate 13 to engage clutch C2. Likewise driven plates 17 are capable of being forced against driving plate 14 to engage clutch C3.

Clutches C1, C2 and C3 are input clutches, and clutches C4, C5 and C6 transmit torque in various speeds to output shaft 43.

Clutches C4, C5 and C6 have pairs of driving plates 38, 39 and 40 respectively, which are slideable axially in actual structure (but shown here in diagram) under the influence of hydraulic pressure to engage driven plates 35, 36 and 37 respectively, which are permanently coupled by web 42 to output shaft 43.

Two planetary gear sets are shown, one comprising sun gear 19, ring gear 23 and intermeshing planet gears 24, rotatably mounted on rollers 47, on pins 45 supported at both sides, 21, of a planet gear carrier. The other planetary gear set comprises sun gear 29, ring gear 33 and intermeshing planet gears 34 rotatably mounted on rollers 48 on pins 46 supported at both sides, 31, of a second carrier.

Carriers 21 and 31 are coupled permanently by sleeve 26. Ring gear 23 and sun gear 29 are coupled together permanently by drum 22, web 48 and shaft 25.

Clutch C1 couples input shaft 10 to sun gear 19 by drum 18 and web 28.

Clutch C2 couples input shaft 10 to carriers 21 and 31 by drum 20.

Clutch C3 couples input shaft 10 to ring gear 23 by drum 22 and to sun gear 29 by shaft 25 and web 48.

Clutch C4 couples ring gear 23 and sun gear 29 by drum 22, shafts 25 and 27 and webs 41 and 48 to output shaft 43.

Clutch C5 couples carriers 21 and 31 through sleeve 26 and drum 44 to output shaft 43.

Clutch C6 couples ring gear 33 through drum 32 to output shaft 43.

In first speed, carriers 21 and 31 are reaction members and ring gear 23 and sun gear 29 are driven backward by the first gear set. Ring gear 33 is then driven forward and becomes the output member.

In second speed the first gear set idles and sun gear 29 is the input gear and with ring gear 33 held as a reaction member, carrier 31 is the output member.

In third, both gear sets are coupled differentially with the input coupled to both ring gear 23 and sun gear 29. Sun gear 19 is the reaction member and ring gear 33 the output member.

In fourth, the first set alone is working with ring gear 23 the input, sun gear 19 the reaction and carrier 21 the output member.

In fifth the gears are coupled differentially in a second way wherein carriers 21 and 31 are input members, sun 19 the reaction member and ring gear 33 again the output member.

Sixth speed is direct drive through carriers 21 and 31.
Seventh speed is an overdrive with the second gear set idle and with input to carrier 21 which drives ring gear 23 at faster than input speed since sun gear 19 is held as a reaction member.

Eighth speed is a still faster overdrive with the first gear set idle and with input to the second carrier 31. Ring gear 33 is held as a reaction member by brake B3, which results in sun gear 29 rotating at high overdrive speed.

First reverse, R1, is obtained with ring gear 33 held for reaction, with input at sun gear 19 and with carriers 21 and 31 as output members. In first reverse both gear sets are coupled differentially.

In second reverse, R2, sun gear 29 is the input member, carrier 31 the reaction and ring gear 33 the output member, with the first gear set idling.

In third reverse, sun gear 19 is the input member, carrier 21 the reaction and ring gear 23 the output member, with the second gear set idling.

In fourth reverse, both gear sets are coupled differentially in a fourth manner which is different from that in third and fifth forward speeds and first reverse speed. In fourth reverse, sun gear 19 is the input member, ring gear 33 the reaction member, and ring gear 23 and sun gear 29 the output members.

If brake B2 is omitted, first forward speed and second and third reverse speeds are omitted.

If brake B2 and clutch C6 are omitted, the transmission then has five forward speeds and two in reverse with first, third, fifth forward speeds, and second and third reverse speeds eliminated.

A combination having five speeds forward and one in reverse is obtained if brake B3 and clutch C1 are omitted, in which case first, second and eighth forward, and first, third and fourth reverse speeds are eliminated. Other combinations with still fewer speeds can be obtained by omitting other friction elements.

In FIG. 2, the gear ratios shown are those which result when ring gears 23 and 33 each have 90 teeth and sun gears 19 and 29 have 60 teeth and 27 teeth respectively.

Following are computations of the various gear ratios in which the number 150 is the sum of the sun and ring gear teeth in the first gear set, and the number 117 is the sum of those of the second set.

$$\text{First} = \frac{90 \times 90}{60 \times 27} = 5.000$$

$$\text{Second} = \frac{117}{27} = 4.333$$

$$\text{Third} = \frac{1.00}{\frac{90 \times 117}{150 \times 90} - \frac{27}{90}} = 2.083$$

$$\text{Fourth} = \frac{150}{90} = 1.667$$

$$\text{Fifth} = \frac{1.00}{\frac{117}{90} - \frac{150 \times 27}{90 \times 90}} = 1.250$$

$$\text{Sixth} = 1.000$$

$$\text{Seventh} = \frac{90}{150} = .600$$

$$\text{Eighth} = \frac{27}{117} = .231$$

$$\text{First reverse} = \frac{150}{60} - \frac{117 \times 90}{27 \times 60} = -4.000$$

$$\text{Second reverse} = \frac{90}{27} = -3.333$$

$$\text{Third reverse} = \frac{90}{60} = -1.5000$$

$$\text{Fourth reverse} = \frac{27 \times 150}{117 \times 60} - \frac{90}{60} = -.923$$

I claim:
1. In a variable speed transmission having input and output members, first and second planetary gear sets, each having a sun gear, a ring gear, and a planet gear carrier member and at least one planet gear meshing with said sun and ring gear members, selectively engageable clutch means for coupling the input member to the sun gear or carrier of the first gear set or to the first set ring gear and second set sun gear, a driving connection between said first carrier and the carrier of the second gear set, a driving connection between said first ring gear and second set sun gear, selectively engageable clutch means for coupling the output member to the sun gear, ring gear or carrier member of the second gear set, and selectively engageable brake means for holding the first set sun gear, the second set ring gear or both carrier members against rotation.

2. In a variable speed transmission having input and output members, first and second planetary gear sets each set having a sun gear, a ring gear and a carrier member and at least one planet gear meshing with said sun gear and ring gear members, a driving connection between the first set ring gear and second set sun gear, a driving connection between the two carrier members and a releaseable brake for holding said carriers, first and second selectively engageable clutches for coupling the input member respectively to the first set sun gear or to the interconnected first set ring gear and second sun gear, third and fourth selectively engageable clutches for coupling the output member respectively to the second sun gear or to the second ring gear whereby, when the brake and said first and fourth clutches are engaged, a forward reduction ratio is obtained at the output member with both of said gear sets coupled in series, and when the brake and said first and third clutches are engaged a reverse reduction ratio produced by the first gear set is transmitted to the output member, and when the brake and second and fourth clutches are engaged a reverse reduction produced by the second gear set is transmitted to the output member.

3. In a variable speed transmission having input and output members, first and second planetary gear sets, each having a sun gear, a ring gear, and a planet gear carrier member and at least one planet gear meshing with said sun and ring gear members, a shaft connection between the first ring gear and second sun gear, a rotatable hollow shaft connected to the first carrier through which said shaft connection passes, a mechanical connection between said hollow shaft and one side of the second carrier, means for coupling the other side of the second carrier to the output shaft, the second set of planetary gears being located between the two sides of said second carrier, selectively engageable clutch means for driving the first sun gear or the interconnected first ring gear and second sun gear at input speed and selectively engageable brake means for holding the first sun gear or second ring gear stationary.

4. In a variable speed transmission having input and output members, first and second planetary gear sets each having sun gear, ring gear, and planet gear carrier members and at least one planet gear meshing with said sun and ring gear members, selectively engageable means for coupling the input member to the first set sun gear or to the first set ring gear and second set sun gear, selectively engageable clutch means for coupling the ouput member to the second set ring gear or second set carrier, a driving connection between the carriers of each gear set, a driving connection between the first set ring gear and second set sun gear, and selectively engageable brake means for holding the first set sun gear or the second set ring gear.

References Cited in the file of this patent

UNITED STATES PATENTS

| | | |
|---|---|---|
| 2,582,487 | Kelbel | Jan. 15, 1952 |
| 2,621,546 | Cleff | Dec. 16, 1952 |
| 2,651,950 | Schou | Sept. 15, 1953 |
| 2,749,767 | Ebsworth | June 12, 1956 |
| 2,865,230 | Simpson | Dec. 23, 1958 |
| 2,873,723 | Simpson | Feb. 17, 1959 |
| 2,932,989 | Winchell | Apr. 19, 1960 |